United States Patent
Gomez

[15] 3,699,667
[45] Oct. 24, 1972

[54] ARITHMETIC TEACHING APPARATUS

[72] Inventor: Peter Devera Gomez, 2036 South "K" Street, Oxnard, Calif. 93030

[22] Filed: April 12, 1971

[21] Appl. No.: 133,270

[52] U.S. Cl. .......................... 35/9 B, 35/6, 35/31 C, 35/48 R
[51] Int. Cl. ...................................................... G09b
[58] Field of Search ......... 35/48 R, 9 B, 9 R, 31 C, 6, 35/8 R

[56] References Cited

UNITED STATES PATENTS

| | | | |
|---|---|---|---|
| 3,245,157 | 4/1966 | Caviana | 35/9 R |
| 3,414,985 | 12/1968 | Ashley | 35/6 |
| 3,416,242 | 12/1968 | Nisbet | 35/48 R |
| 3,500,555 | 3/1970 | Best | 35/8 R |
| 3,546,791 | 12/1970 | Koos et al. | 35/9 B |
| 3,570,146 | 3/1971 | Golden | 35/9 R |
| 3,628,255 | 12/1971 | Golden | 35/48 R |

FOREIGN PATENTS OR APPLICATIONS 1,158,881   7/1964   Great Britain.............35/9 B

*Primary Examiner*—Robert W. Michell
*Assistant Examiner*—J. H. Wolff
*Attorney*—Pastoriza & Kelly

[57] ABSTRACT

A teacher's unit includes means for displaying numerals defining a selected problem by the teacher. Simultaneously, the numerals defining the problem are displayed on a classroom display unit. The teacher can then display the correct answer on his own display unit but such answer will not appear on the classroom display unit. Each of the students is provided with a student's unit connected to the classroom display means such that the student can attempt to display numerals defining the answer to the problem on the classroom display means. The student is only successful if he selects the correct answer corresponding to the answer set up by the teacher on the teacher's display unit.

7 Claims, 4 Drawing Figures

PATENTED OCT 24 1972 3,699,667

INVENTOR.
PETER D. GOMEZ
BY Pastoriza & Kelly
ATTORNEYS

PATENTED OCT 24 1972 3,699,667

INVENTOR.
PETER D. GOMEZ
BY Pastoriza & Kelly
ATTORNEYS

ARITHMETIC TEACHING APPARATUS

This invention relates generally to teaching devices and more particularly to apparatus for teaching numerals and simple arithmetic operations to elementary school children.

BACKGROUND OF THE INVENTION

Teaching devices for classroom use capable of displaying problems on a screen or a display readout device are well known in the art. Primarily, the devices constitute visual aids to facilitate instructing children in letters as well as numbers.

The majority of such devices as have been proposed relate to high school or college instruction and necessarily become somewhat complicated both from a mechanical and electrical standpoint. As a result, malfunctions can often occur with a subsequent loss of time of both the teacher and the students. Further, some of these devices are so complicated that extensive training is required for the teacher to operate the apparatus.

Simpler types of devices have been proposed for teaching elementary school children but again some of these devices are still unduly complicated and none are available which really permits the grade school child to participate in the actual operation. This latter fact is important in utilizing teaching devices in that whenever a child feels he is a part of an activity, he will learn more quickly.

BRIEF DESCRIPTION OF THE PRESENT INVENTION

With the foregoing considerations in mind, the present invention contemplates a very simple and inexpensive teaching apparatus characterized by the significant advantages of not requiring a trained teacher to operate the same, substantially complete absence of the possibility of any malfunctioning, and in which most importantly the students themselves may participate in the operation.

More particularly, the invention is primarily directed towards the teaching of elementary arithmetic to grade school children, specifically the numerals themselves and the functions of addition, subtraction, multiplication and division. In essence, the apparatus includes a teacher's unit or first display means and a classroom display unit constituting a second display means. A third means constituting a student's unit is provided interconnected with the classroom display means.

The three units are designed such that a teacher may display numerals simultaneously in the teacher's own unit and in the classroom display unit defining a selected problem. Thereafter, the teacher may display the answer to the problem in the teacher's display unit but such answer will not appear in the classroom display unit. Rather, operation of the student's unit by the student himself is necessary to display the correct answer on the classroom display means. The arrangement is such that the student is only successful in displaying an answer if the selected answer by the student corresponds to the answer displayed by the teacher on the teacher's display unit. The teacher's display unit is visible only to the teacher or instructor so that effectively the student must attempt to solve the problem.

BRIEF DESCRIPTION OF THE DRAWINGS

A better understanding of the invention will be had by referring to a preferred embodiment as shown in the accompanying drawings in which.

DETAILED DESCRIPTION OF THE INVENTION

Figure 1:
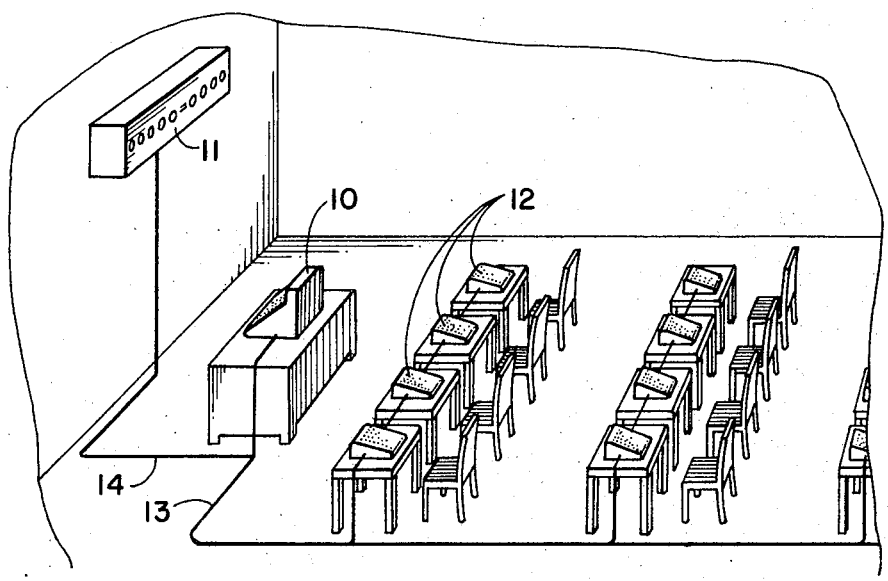
FIG. 1 shows an elementary school classroom in which the teaching apparatus of the present invention may be used.

Referring first to FIG. 1 the teaching apparatus comprises a teacher's unit 10, a classroom display means 11 and at least one and preferably a plurality of student's units 12. The teacher's unit 10 includes display means visible only to the teacher while the classroom display means 11 is visible to the entire class. The units are interconnected by cables 13 and 14.

Figure 2:
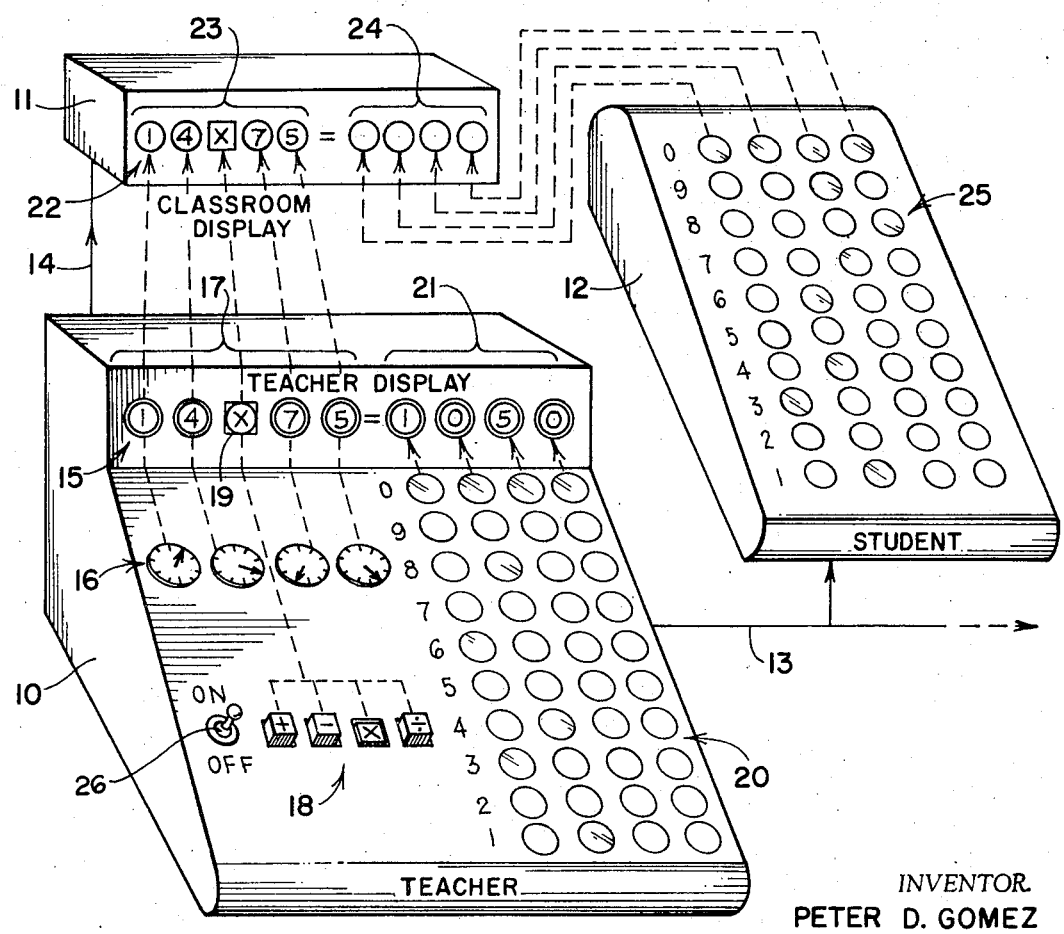
FIG. 2 illustrates in perspective view the three basic units making up the apparatus and the major interconnections therebetween.

Referring now to FIG. 2, the respective units 10, 11 and 12 will be described in greater detail. Referring first to the teacher's unit 10, there is shown a display means 15 including horizontally aligned windows within certain ones of which a selected numeral may be displayed. Below this display are a series of problem switch means 16 connected to a portion of the display means 15 designated a problem display means emcompassed by the numeral 17. Also provided are function switches 18 in the form of push buttons connected to one of the windows 19 included in the problem display means 17. The function switches 18 enable a symbol designating addition, subtraction, multiplication, or division to be displayed in the window 19 depending upon the particular switch button depressed. The problem switch means 16 in turn enable the inserting of any desired numeral in the pairs of windows on either side of the function window 19.

On the right hand portion of the teacher's unit 10 there are provided a plurality of teacher's answer switch means 20 in the form of four columns of 10 push button switches each. These teacher's answer switch means connect to another portion of the display 15 constituting a teacher's answer display means encompassed by the numeral 21. The arrangement is such that any of the digits 1,2,3,4,5,6,7,8,9 and 0 may be displayed in the teacher's answer display windows 21.

Referring now to the classroom display unit 11, there is a display means 22 including a classroom problem display means in the form of windows 23 and a classroom answer display means in the form of windows 24. As indicated by the dashed lines terminating in arrows, the same numerals defining a problem in the teacher's problem display means 17 also appear in the classroom problem display 23 simultaneously.

Each of the student's units are identical and thus description of one of the units 12 will suffice for all. As shown, the student's unit includes a student answer switch means in the form of push buttons 25 arranged in four columns of 10 push button switches each the same as for the teacher's answer switch means 20 described in FIG. 2. The student's answer switch means 25 connect as indicated by the dash line terminating in arrows to the classroom answer display means 24 in the display unit 11. Also, the student's unit 12 is connected to the teacher's unit 16 as indicated by the line 13 as shown in both FIGS. 1 and 2. Additional student's units would simply be paralleled from the line 13.

Figure 3:
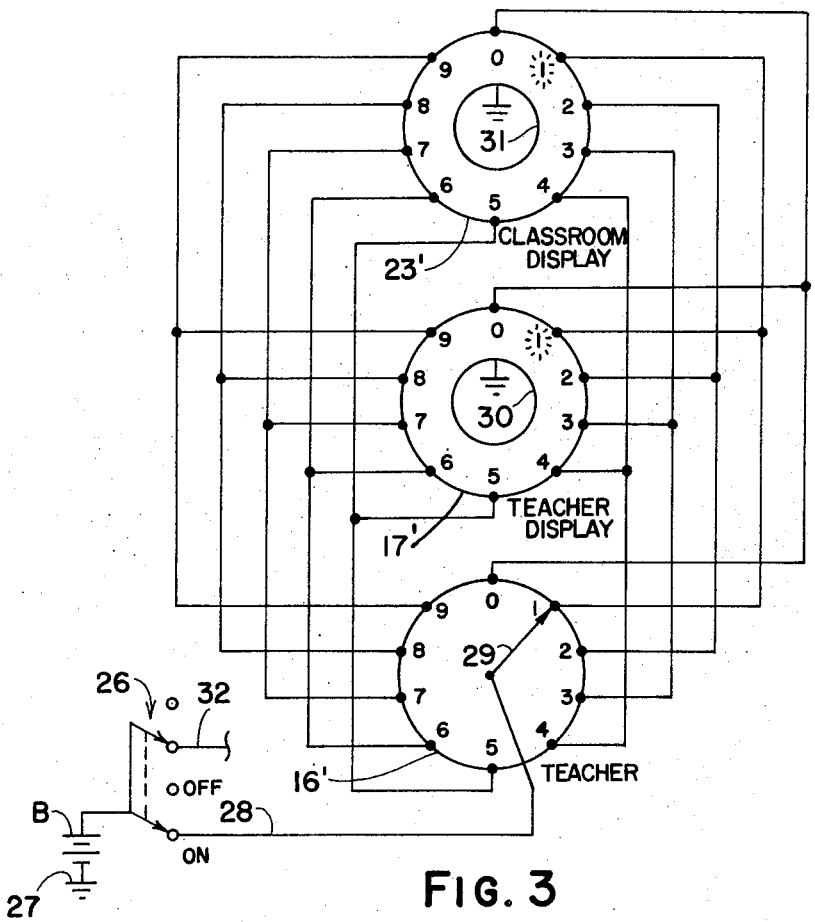
FIG. 3 is a schematic circuit diagram of typical switch and display portions of the units in FIG. 2; and, FIG. 4 is a schematic diagram showing further switching and display portions incorporated in the units of FIG. 2.

Referring now to FIG. 3, the manner in which a teacher may set up a simple arithmetic problem in the teacher's problem display means 17 by manipulation of the problem switches 16 will be described. In FIG. 3, there is shown only the first problem switch means designated 16'. This switch means connects to the first of the teacher's problem display means 17, this particular window being designated 17'. Similarly, the first window of the classroom problem display means 23 is shown at 23' in FIG. 3.

The window display means 17' and 23' may include any one of a number of conventional data readout systems. For example, each display may include nixie tubes having ten output contacts corresponding to the 10 numerical digits including 0 as shown in FIG. 3. Referring to the left portion of FIG. 3, there is shown a battery B one end of which is grounded at 27 and the other of which connects through one portion of the on-off switch 26 to a line 28. The line 28 connects to a wiper arm 29 of the teacher's problem switch means 16'. Suitable circuits connect the various contacts for the wiper arm 29 with the corresponding contacts for the display means. It will be noted that the teacher's display and classroom display include ground rings 30 and 31 respectively connecting to the other sides of the nixie tubes. Thus, when any particular digit is selected by the wiper arm 29 such as the digit 1, the corresponding digit will be displayed simultaneously in the teacher's display and the classroom display.

The remaining problem switch means 16 of FIG. 2 operate in an identical manner.

With respect to the function switch means 18 shown in FIG. 2, there may be provided a similar display described at 19 which will simply indicate a function sign such as +, −, ×, or depending upon the particular button depressed. As shown in FIG. 2, the multiplication switch is depressed so that the multiplication sign appears in the window 19.

Figure 4:
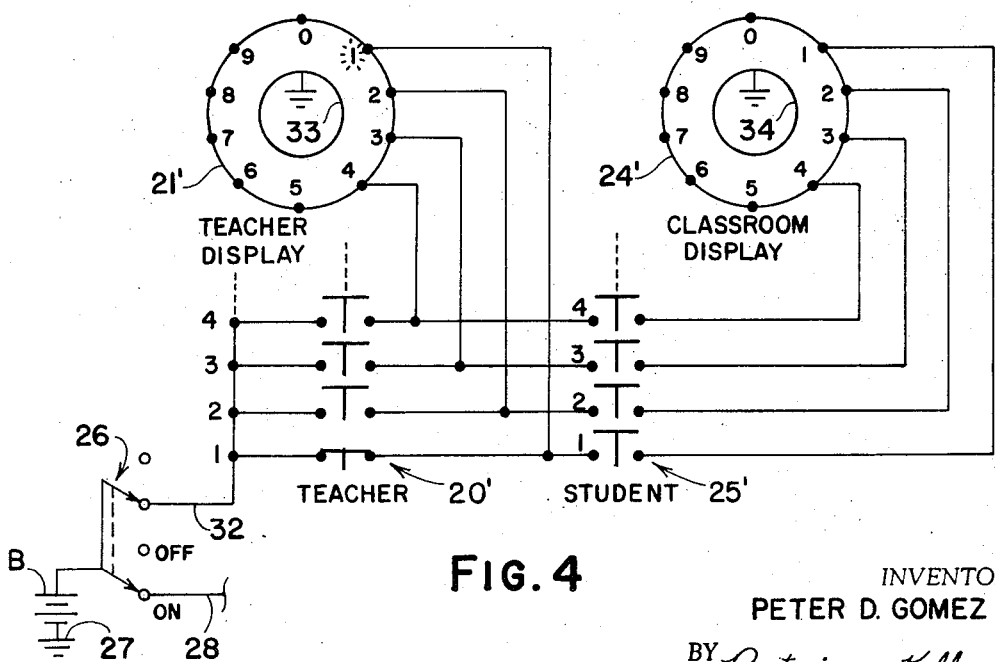

Referring now to FIG. 4, the inner connections between the teacher's answer switch means 20 described in FIG. 2 and the student's answer switch means 25 will be described. Again for the sake of simplicity only one particular display window is selected it being understood that the others operate in an identical manner. As shown in FIG. 4, the first of the teacher's answer display window means is indicated at 21' and the first of the classroom answer display means 24 is indicated at 24'. Again these units may constitute nixie tubes.

Referring to the lower portion of FIG. 4, the battery B and ground 27 are shown repeated, the upper end of the on-off switch arm structure 26 connecting to a line 32 in turn passing to the first column of push buttons designated 20' in FIG. 4 for the teacher's unit. These lines include a corresponding set or column of the student's answer switch means designated 25' connected in series and thence to the proper contacts on the classroom display answer windows. Only four of the 10 push button switch means in the columns are shown in FIG. 4. Suitable ground rings 33 and 34 serve as return circuits for the nixie tubes.

It will be evident that because of the series connections, the student can only display the correct answer when a push button connected in series with a closed teacher's push button is depressed. In the particular example chosen, the first digit of the answer is 1 and the teacher's push button 20' for the numeral 1 is shown depressed. The result is that the numeral 1 will be displayed on the teacher's display but not on the classroom display until such time as the student should depress his corresponding switch button.

OPERATION

The operation of the teaching apparatus will be evident from the foregoing description.

First, the display unit may be utilized to teach numerals themselves to students. Thus any one of the numerical symbols 1–0 can be displayed for example in the problem display windows of the classroom display and the students can be questioned orally as to the particular display numeral.

In advancing further during the instruction, simple addition problems can be set up by the instructor on his display unit and also on the classroom display. A selected student will then attempt to indicate the answer in the classroom display by operating appropriate switch buttons on his unit.

Also, multiplication and division problems can be set up and a selected student asked to attempt to display the correct answer.

As a particular example, parts of which have already been described in the drawings, assume that the teacher wishes to set up the multiplication problem 14 × 75. Referring to FIG. 2, the appropriate problem switch means 16 will be manipulated respectively to display the four digits 1, 4, 7, and 5 and the multiplication sign will be displayed in the window 19. Because of the interconnections as described in FIG. 3, the identical numerals will appear in the problem portion of the classroom display. The teacher will then operate his appropriate answer switch means 20 to display the answer 1050 in the answer display portion of the teacher's unit. However, this answer will not appear in the answer portion 24 of the classroom display because of the connections described in FIG. 4 wherein the student's units answer switch means are normally all open.

It will now be evident that a student can only display the correct answer if he selects the answer push buttons among the switch means 25 corresponding precisely to the same buttons operated by the teacher. When such is accomplished, the series circuits to the classroom display will be closed as described in FIG. 4 and the correct answer will be displayed.

It will be noted from the foregoing that the students themselves play a vital role in operating the teaching apparatus and thus their interest is retained and the elementary functions of arithmetic can be very quickly learned.

What is claimed is:

1. An apparatus comprising, in combination: first display means and second display means connected to each other for simultaneously displaying numerals defining a selected problem; means associated with said first display means for displaying numerals defining the answer to said problem on said first display means; and further means associated with said first and second display means being operable to display numerals defining the answer to said problem on said second display means, if the answer selected by an operator of said further means corresponds with the answer displayed on said first display means.

2. An apparatus according to claim 1, in which said first display means is operated by a teacher, said second display means is visible to a large number of students in a classroom, and said third means is operable by a student.

3. An apparatus according to claim 2, in which said selected problem may be in addition, subtraction, multiplication or division.

4. An apparatus for teaching numerals, addition, subtraction, multiplication and division to elementary classroom students, comprising in combination:
 a. a teacher's unit including:
  1. a teacher's problem display means;
  2. a problem switch means connected to said display means whereby any selected numbers may be displayed in said display means by operating said switch means to define a problem;
  3. a teacher's answer display means; and
  4. a teacher's answer switch means connected to said answer display means whereby a teacher may display numbers in said answer display means by operating said answer switch means to define the answer to said problem;
 b. a classroom display means including:
  1. a classroom problem display means connected to said problem switch means in said teacher's unit; and
  2. a classroom answer display means;
 c. at least one student's unit including a student's answer switch means connected to said classroom answer display means; and
 d. means connecting said teacher's answer switch means in series with said student's answer switch means whereby a teacher may display a selected set of numerals defining a problem simultaneously on said teacher's problem display means and said classroom problem display means and then operate said teacher's answer switch means to display the answer only on said teacher's answer display means, a student then attempting to operate his student answer display means to display the answer on said classroom answer display means with said answer only appearing on said classroom answer display means when said teacher selected answer and the student selected answer coincide.

5. An apparatus according to claim 4, in which each said teacher's problem display means, answer display means, and classroom display means include horizontally aligned numeral display windows within each of which may be caused any one of the numerals 1,2,3,4,5,6,7,8,9, or 0 to appear by appropriate operation of said teacher's problem switch means, teacher's answer switch means, and student's answer switch means, respectively.

6. An apparatus according to claim 5, in which said teacher's problem switch means includes function switches for selectively displaying addition, subtraction, multiplication and division symbols, said teacher's problem display means and classroom problem display means each including a window for displaying simultaneously a selected symbol upon operation of a corresponding one of said function switches.

7. An apparatus according to claim 6, including a plurality of student's units connected in parallel with said one student's unit whereby any selected student having a unit can attempt to display a correct answer on said classroom answer display means.

* * * * *